US009550899B2

(12) United States Patent
Ingle, Jr. et al.

(10) Patent No.: US 9,550,899 B2
(45) Date of Patent: Jan. 24, 2017

(54) LATEXES AND ASSOCIATED INKJET INKS

(75) Inventors: David Michael Ingle, Jr., San Diego, CA (US); Phillip C. Cagle, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/426,652

(22) PCT Filed: Sep. 14, 2012

(86) PCT No.: PCT/US2012/055656
§ 371 (c)(1),
(2), (4) Date: Mar. 6, 2015

(87) PCT Pub. No.: WO2014/042653
PCT Pub. Date: Mar. 20, 2014

(65) Prior Publication Data
US 2015/0225582 A1    Aug. 13, 2015

(51) Int. Cl.
| | | |
|---|---|---|
| *C09D 11/322* | (2014.01) | |
| *C09D 11/38* | (2014.01) | |
| *C09D 11/36* | (2014.01) | |
| *C08F 20/00* | (2006.01) | |
| *C08F 2/22* | (2006.01) | |
| *C08F 265/06* | (2006.01) | |
| *C09D 11/106* | (2014.01) | |
| *C09D 11/30* | (2014.01) | |
| *C09D 11/107* | (2014.01) | |
| *C09D 11/12* | (2006.01) | |

(52) U.S. Cl.
CPC ............ *C09D 11/322* (2013.01); *C08F 2/22* (2013.01); *C08F 20/00* (2013.01); *C08F 265/06* (2013.01); *C09D 11/106* (2013.01); *C09D 11/107* (2013.01); *C09D 11/12* (2013.01); *C09D 11/30* (2013.01)

(58) Field of Classification Search
CPC ....... C09D 11/322; C09D 11/38; C09D 11/36; C09D 11/107
USPC ...................................................... 524/501
See application file for complete search history.

(56) References Cited

U.S. PATENT DOCUMENTS

| | | | |
|---|---|---|---|
| 4,478,974 A | 10/1984 | Lee et al. | |
| 5,308,890 A | 5/1994 | Snyder | |
| 5,814,685 A | 9/1998 | Satake et al. | |
| 6,412,939 B1 | 7/2002 | Schultz et al. | |
| 2005/0137282 A1* | 6/2005 | Cagle | C09D 11/30 523/160 |
| 2006/0063868 A1 | 3/2006 | Janmaat et al. | |
| 2006/0235110 A1* | 10/2006 | Vincent | B41M 7/0027 523/160 |
| 2009/0239057 A1 | 9/2009 | Quintens et al. | |
| 2011/0050790 A1 | 3/2011 | Irita | |
| 2012/0128743 A1 | 5/2012 | Hawkett et al. | |

FOREIGN PATENT DOCUMENTS

| | | |
|---|---|---|
| CN | 1869083 | 11/2006 |
| CN | 101014628 | 8/2007 |
| EP | 0466409 | 9/1997 |
| EP | 0728779 | 7/2001 |
| EP | 1435380 | 7/2004 |
| EP | 2371574 | 10/2011 |
| JP | H0741683 | 2/1995 |
| JP | 2010013505 | 1/2010 |
| WO | 0138412 | 5/2001 |
| WO | 0144326 | 6/2001 |
| WO | 2010151266 | 12/2010 |
| WO | 2011074167 | 6/2011 |

OTHER PUBLICATIONS

International Search Report and Written Opinion dated Mar. 27, 2013 for International Application No. PCT/US2012/055656 filed Sep. 14, 2012, Applicant Hewlett-Packard Development Company, L.P. et al.

Tzitzinou et al., Film Formation of Latex Blends with Bimodal Particle Size Distributions: Consideration of Particle Deformability and Continuity of the Dispersed Phase, Macromolecules, vol. 33, No. 7, pp. 2695-2708, 2000.

Extended European Search Report dated Apr. 21, 2016 for PCT/US2012/055656, Applicant Hewlett-Packard Development Company, L.P.

Hourston et al., Latex Interpenetrating Polymer Networks Based on Acrylic Polymers. I. Predicted and Observed Compatibilities, Journal of Applied Polymer Science, vol. 29, 2969-2980 (1984).

Hourston, et al., Latex Interpenetrating Polymer Networks Based on Acrylic Polymers. II. The Influence of the Degree of Network Compatibility on Morphology, Journal of Applied Polymer Science, vol. 31, 1955-1962 (1986).

Hourston et al., Latex Interpenetrating Polymer Networks Based on Acrylic Polymers. III. Synthesis Variations, Journal of Applied Polymer Science, vol. 33, 215-225 (1987).

Hourston et al., Latex Interpenetrating Polymer Networks Based on Acrylic Polymers. IV. The Influence on Mechanical Properties of the Time of Swelling the Seed Particles with the Second Monomer, Journal of Applied Science, vol. 34, 901-908 (1987).

Borthakur et al., Preparation of core-shell latex particles by emulsion co-polymerization of styrene and butyl acrylate, and evaluation of their pigment properties in emulsion paints, J. Coat. Technol. Res., 7 (6) 765-772 (2010).

* cited by examiner

*Primary Examiner* — James J Seidleck
*Assistant Examiner* — Deve E Valdez
(74) *Attorney, Agent, or Firm* — Thorpe, North & Western L.L.P.

(57) ABSTRACT

The present disclosure provides latexes and related methods and inkjet inks incorporating such latexes. A latex particulate can comprising multiple intermingled discrete polymer strands, including a low Tg polymer strand having a Tg below 50° C. and a high Tg polymer strand having a Tg at 50° C. or above. The Tg of the high Tg polymer strand can be at least 50° C. greater than the Tg of the low Tg polymer strand, and the average refractive index of the monomers of the low Tg polymer strand can be within 1% of the average refractive index of the monomers of the high Tg polymer strand.

11 Claims, No Drawings

LATEXES AND ASSOCIATED INKJET INKS

BACKGROUND

Digital inkjet printing of signs and other graphic arts applications is increasingly replacing screen printing and other analog printing technologies. Digital inks for large format printing provide good image quality, durability, and permanence. While many of the inks in use are solvent-based, in recent years efforts have been made to replace solvent-based inks with water-based inks. Many of the media substrates are nonporous coated papers or polymer films such as vinyl.

Durability of aqueous inks on nonporous media poses a challenge. An ink typically needs to wet and adhere to a broad range of substrates, have good abrasion and scratch resistance, resist attack by water, cleaning fluids, and solvents, and have good outdoor weatherability. There have been great improvements in the durability of aqueous inkjet inks through incorporation of certain inkjet compatible latex polymer dispersions made by emulsion polymerization. When printed as part of an inkjet ink, a latex component of the ink can form a film on a media surface, entrapping and protecting the colorant within the hydrophobic print film.

This being said, while latex particulates can improve durability of prints, they undergo severe thermal shear conditions when printed through thermal inkjet print heads, leading to nozzle reliability issues. Moreover, those polymers tend to settle out of inks over time and, therefore, often are not stable in many storage conditions. Thus, there is a continuing need to provide latex particulates having improved stability and durability for printing on a wide variety of media types and with a variety of printing architectures.

DETAILED DESCRIPTION

It has been recognized that latex particulates can be designed to mimic polyurethane dispersions using non-polyurethane components. Furthermore, such latex particulates can be incorporated into inkjet inks to provide excellent print durability properties. In accordance with this, latex particulate compositions and associated methods described herein can include intermingled low Tg polymer strands and high Tg polymer strands providing for a unique latex structure. It is noted that when discussing the present compositions, inks, and methods, each of these discussions can be considered applicable to each of these embodiments, whether or not they are explicitly discussed in the context of that embodiment. Thus, for example, in discussing a high Tg polymer strand in a latex particulate, such a high Tg polymer strand can also be used in a method of making a latex particulate, and vice versa.

Polyurethane dispersions (PUD) provide desirable characteristics in printing applications, including excellent scratch resistance due to a blend of hard and soft segments in the urethane particles. While this scratch resistance is attractive, thermoplastic PUDs can have issues with wet durability, including solvent resistance. Adhesion is often worse than with corresponding latex particles, and further, PUDs typically have higher costs. However, it has been recognized that latex particulates can be manufactured having a structure that mimics some of the positive polyurethane properties, thereby providing superior scratch resistance without the use of polyurethane materials. To this end, vinyl monomers can be used to mimic the soft and hard domains found in polyurethanes polymers by synthesizing vinyl latex particulates having intermingled low Tg polymer strands and high Tg polymer strands.

With the above in mind, a latex particulate can comprise multiple intermingled discrete polymer strands, including a low Tg polymer strand having a Tg below 50° C. and a high Tg polymer strand having a Tg at 50° C. or above. The Tg of the high Tg polymer strand can be at least 50° C. greater than the Tg of the low Tg polymer strand, and the refractive index of the low Tg polymer strand can be within 1% of the refractive index of the high Tg polymer strand. Notably, by matching the refractive index of the monomers of the polymer strands, the present latex particulates can provide superior gloss and haze. As used herein, "latex particulate" refers to discrete polymeric particles dispersed in a liquid, whereas the term "latex" refers to both the latex particulate and the liquid in combination. In one example, a latex particulate can be dispersed in a liquid vehicle to form an ink. In one aspect, the ink can be an inkjet ink and can further comprise a colorant.

The low Tg polymer strand can be prepared from multiple co-monomers. Such multiple co-monomers generally include 2 or more monomers. In one example, the high Tg polymer strand can be prepared from the same monomers used in the preparation of the low Tg polymer strand but at a different ratio. To illustrate, the low Tg polymer strand can be polymerized from two monomers in a ratio ranging from 80:20 to 50:50 and the high Tg polymer strand can be polymerized from the same monomers in a ratio ranging from 40:60 to 5:95. The ratio of soft to hard polymer strand can vary from 50:50 to 10:90. Varying the ratio can provide for different Tgs. By using the same co-monomers, the polymer strands can have a similar refractive index; by using three co-monomers, the polymers' refractive index may be able to be controlled with even greater accuracy, while controlling Tg simultaneously. In one example, the refractive index of the low Tg polymer strand can be within 1% of the refractive index of the high Tg polymer strand. In one aspect, the refractive index of the low Tg polymer strand can be within 0.5% of the refractive index of the high Tg polymer strand. Additionally, the multiple co-monomers can be selected to have a refractive index within 1% of one another when polymerized, or in one aspect, within 0.5% of each other when polymerized. It is noted that the same monomers do not necessarily need to be used for the low Tg and the high Tg polymer strands, provided the refractive indexes are kept within the bounds described herein. Using the same or similar monomers at different ratios is merely one method of providing strands with similar refractive indexes.

Generally, the low Tg polymer strand and the high Tg polymer strand have differing Tg's such that the resulting latex particulate provides hard and soft domains similar to a polyurethane dispersion. In one example, the Tg of the low Tg polymer strand can be at or below 20° C. In one aspect, the Tg can be at or below 0° C. In another example, the Tg of the high Tg polymer strand can be at or above 90° C. In another aspect, the Tg can be at or above 100° C. Additionally, the difference in the Tg's between the low Tg polymer strand and the high Tg polymer strand is generally at least 50° C. In one example, the difference can be at least 70° C. In one aspect, the difference can be at least 90° C., and in another aspect, can be at least 100° C.

The monomers used in the present polymer strands can be vinyl monomers. In one example, the monomers can be selected from the group of vinyl monomers, acrylate monomers, methacrylate monomers, styrene monomers, ethylene, vinyl chloride, vinylidene chloride, maleate esters, fumarate esters, itaconate esters combinations thereof, and mixtures thereof. In one aspect, the monomers can include acrylates, methacrylates, and styrenes. Additionally, the monomers can include hydrophilic monomers including acid monomers, and hydrophobic monomers. Monomers that can be polymerized in forming the high Tg and low Tg polymer strands include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, and mixtures thereof.

Acidic monomers that can be polymerized in forming the high Tg and low Tg polymer strands include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the present latex particulates can be used in inks. In one example, an inkjet ink can comprise an ink vehicle and any of the latex particulates described herein. The inkjet can also include a colorant. In one aspect, the colorant can be a pigment. In one specific aspect, the pigment can impart color to the ink.

As used herein, "liquid vehicle" or "ink vehicle" refers to the liquid fluid in which a latex particulate is placed to form an ink. In one example, the liquid vehicle can also include a colorant. Ink vehicles are well known in the art, and a wide variety of ink vehicles may be used with the systems and methods of the present invention. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc., provided there are no multivalent metal salts present in the liquid vehicle. Additionally, the term "aqueous liquid vehicle" or "aqueous vehicle" refers to a liquid vehicle including water as a solvent. In one aspect, water can comprise a majority of the liquid vehicle.

Further, as mentioned, the inks of the present disclosure can also include a colorant, which can be a dye and/or pigment. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics, metallic particulates, or other opaque particles.

Regarding the latex particulates, the latexes can have various shapes, sizes, and molecular weights. In one example, the latex particulates may have a weight average molecular weight ($M_w$) of about 5,000 to about 500,000. In one aspect, the latex particulates can have a weight average molecular weight ($M_w$) ranging from about 100,000 to about 500,000. In some other examples, the latex resin has a weight average molecular weight of about 200,000 to 300,000.

Further, the average particle diameter of the latex particles can be from about 10 nm to about 1 µm; in some other examples, from about 10 nm to about 500 nm; and, in yet other examples, from about 100 nm to about 300 nm. The particle size distribution of the latex is not particularly limited, and either latex having a broad particle size distribution, bimodal particle size distribution, or latex having a mono-dispersed particle size distribution may be used. It is also possible to use two or more kinds of latex particles each having a mono-dispersed particle size distribution in combination.

The latex compositions, including the inkjet ink compositions, of the present disclosure can also be suitable for use on many types of substrates of recording media, including but not limited, non-porous vinyl media. In one example, the media can be gloss media. As used herein, "gloss" refers generally to the amount of light reflected by an object's surface, such as, e.g., an inkjet media surface. Gloss can be quantified and measured relative to specific specular angles from an object surface. The specular angle is the angle equal to but opposite the angle of incidence. This specular light is responsible for the highlights visible on shiny materials. When quantifying gloss, it can be measured at angles of 20°, 60°, and 85° off of the normal. Gloss measurements are indicated by gloss units in relation to the angle used for measurement. In one specific example, as used herein, "60° gloss" is the gloss of an image measured by using "BYK-Gardner micro-TRI-gloss" meter with incident angle set at 60°.

Typical ink vehicle formulations described herein can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the colorant, the balance of the formulation can be purified water, or other vehicle components known in the art, such as biocides, viscosity modifiers, materials for pH adjustment, sequestering agents, preservatives, and the like. In one example, the ink vehicle can be predominantly water and can be referred to as an aqueous liquid vehicle.

In one embodiment, the present inkjet inks can include alkyl ethoxylate surfactants. Such surfactants can include, but are not limited to, TERGITOL® 15-S-7, TERGITOL® 15-S-9, TERGITOL® TMN-6 90%, and NEODOL® 91-6. In one example, the surfactant can have an HLB value ranging from about 12 to about 13.5. As used herein, "HLB" refers to hydrophile-lipophile-balance which is a measure of the balance or proportion of hydrophilic to lipophilic portions of a molecule. In another example, the surfactant can be present in the inkjet ink at a concentration ranging from about 1.5 wt % to about 3.5 wt %. In still another example, the surfactant can have a pour point of less than 10° C. As used herein, "pour point" refers to is the lowest temperature at which a liquid becomes semi solid and loses its flow characteristics.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In one example, for printing on non-porous media, the present inks can comprise an ink vehicle, a surfactant, and a cationic polymer, where the ink vehicle includes water and co-solvent. The co-solvent can have a boiling point from 160° C. to 250° C. and is generally present in an amount of 1 wt % to 40 wt %, such that the ink is formulated for printing on non-porous media. Also, the ink vehicle generally does not include more than 5 wt % volatile co-solvent, where "volatile" is defined as a solvent having a boiling point lower than 160° C., and also does not generally include more than 3 wt % non-volatile co-solvent, hereby defined as a solvent having a boiling point greater than 250° C. Water is not a solvent or co-solvent, but is in addition to the co-solvents of the present disclosure. In one specific aspect, the ink vehicle can include multiple co-solvents having a boiling point ranging from 160° C. to 250° C. In another example, the ink vehicle can be devoid of non-volatile solvent. In still another example, the ink vehicle can be devoid of volatile solvent.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

In addition to the latex particulates described herein, the present disclosure provides for methods relating thereto. Generally, a method of making a latex particulate can comprise polymerizing a first ratio of multiple co-monomers to form first polymer strands, introducing a second ratio of the same co-monomers, and polymerizing the second ratio of the same co-monomers to form the latex particulate including second polymer strands that are discrete and intermingled with the first polymer strands.

The latex particulate is generally formed in two stages, forming a first set of polymer strands and then a second set of polymer strands. Without intending to be bound by any particular theory, it is thought that after the first polymer strands are synthesized into an initial latex particulate, a second ratio of the monomers can be introduced to the initial latex particulate, the monomers form the second set of polymer strands within the initial latex particulate thereby forming a final latex particulate that comprises two different types of discrete polymer strands that are intermingled. Notably, such latex structure is different than traditional copolymer and/or homogenous copolymer latexes or core/shell latexes that have a first polymer in an inner core and a second polymer forming an outer shell around the core.

In one example, the first polymer strands can be low Tg polymer strands and the second polymer strands can be high Tg polymer strands. Alternatively, in another example, the first polymer strands can be high Tg polymer strands and the second polymer strands can be low Tg polymer strands. As such, the present latex structure can be manufactured independently of the sequence of polymer strand formation.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

Perceived color quality can be quantified using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present latex compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present ink set compositions and methods have been described above with particularity, the following examples provide further detail in connection with what are presently deemed to be the acceptable embodiments.

Example 1

Latex Preparation A

A latex particulate was prepared as follows. Water (169 g) was heated to 77° C. with mechanical agitation. An aqueous emulsion comprised of water (13.7 g), copolymerizable surfactant Hitenol BC-10 (0.70 g) (Dai-Ichi Kogyo Seiyaku Co., Ltd), styrene (17.7 g) and butyl acrylate (37.5 g) was prepared. At 77° C., 2 g (3%) of this monomer emulsion was added to the reactor followed by 0.37 g potassium persulfate (dissolved in a minimal amount of water). After 15 minutes, this monomer mixture was added to the reactor over 72 minutes. When the first polymerization was completed, a second emulsion comprised of water (34.9 g), copolymerizable surfactant Hitenol BC-10 (1.6 g), styrene (21.1 g), methyl methacrylate (99.0 g), butyl acrylate (6.1 g) and methacrylic acid (2.6 g) was added over 168 minutes. Residual monomer was reduced by typical methodology; i.e., using ascorbic acid and t-butyl hydroperoxide. After cooling to near ambient temperature, pH was adjusted to ~8 with dilute potassium hydroxide; inkjet suitable aqueous biocides were added. The two monomer compositions' average homopolymer refractive indices were 1.5±0.2. The resulting acrylic latex was 41% solids; particle size 0.23μ; viscosity<50 cps and had a latex structure consisting of intermingled polymer strands.

Example 2

Latex Preparation B

Comparative Latex

A latex particulate was prepared as follows. Water (125 g) was heated to 77° C. with mechanical agitation. An aqueous emulsion comprised of water (29.5 g), copolymerizable surfactant Hitenol BC-10 (1.5 g) (Dai-Ichi Kogyo Seiyaku Co., Ltd), methyl methacrylate (88.9 g), styrene (25.5 g) and butyl acrylate (4.7 g), methacrylic acid (0.6 g) was made. At 77° C., 2 g (1%) of this monomer emulsion was added to the reactor followed by 0.12 g potassium persulfate (dissolved in a minimal amount of water). After 15 minutes, this monomer mixture was added to the reactor over 180 minutes. Residual monomer was reduced by typical methodology; i.e., using ascorbic acid and t-butyl hydroperoxide. After cooling to near ambient temperature, pH was adjusted to ~8 with dilute potassium hydroxide; inkjet suitable aqueous biocides were added. The resulting acrylic latex was 41% solids; particle size 0.22μ; viscosity<50 cps and had a traditional homogenous latex structure.

Example 3

Latex Preparation C

A latex particulate was prepared as follows. Water (169 g) was heated to 77° C. with mechanical agitation. An aqueous emulsion comprised of water (34.9 g), copolymerizable surfactant Hitenol BC-10 (1.6 g)(Dai-Ichi Kogyo Seiyaku Co., Ltd), styrene (21.1 g), methyl methacrylate (99.0 g), butyl acrylate (6.1 g) and methacrylic acid (2.6 g) was prepared. At 77° C., 2 g (1.4%) of the monomer emulsion was added to the reactor followed by 0.37 g potassium persulfate (dissolved in a minimal amount of water). After 15 minutes, this monomer mixture was added over 168 minutes. When the first polymerization was completed, a second emulsion comprised of water (13.7 g), copolymerizable surfactant Hitenol BC-10 (0.70 g), styrene (17.7 g) and butyl acrylate (37.5 g) was added over 72 minutes. Residual monomer was reduced by typical methodology using ascorbic acid and t-butyl hydroperoxide. After cooling to near ambient temperature, pH was adjusted to ~8 with dilute potassium hydroxide; inkjet suitable aqueous biocides were added. The two monomer compositions' average homopolymer refractive indices are 1.5±0.2. The resulting acrylic latex is 41% solids; particle size 0.23μ; viscosity<50 cps and had a latex structure consisting of intermingled polymer strands.

Example 4

Latex Preparation D

Comparative Latex

A latex particulate was prepared as follows. Water (191.6 g) was heated to 77° C. with mechanical agitation. An aqueous emulsion comprised of water (16.6 g), copolymerizable surfactant Hitenol BC-10 (0.35 g)(Dai-Ichi Kogyo Seiyaku Co., Ltd), methyl methacrylate (21.1 g), 2-ethylhexyl acrylate (49.3 g) and tetraethyleneglycol dimethacrylate (1.4 g) was prepared. At 77° C., 2.7 g (3%) of this monomer emulsion was added to the reactor followed by 0.37 g potassium persulfate (dissolved in a minimal amount of water). After 15 minutes, the monomer emulsion mixture was added over 180 minutes. When the first polymerization was completed, a second emulsion comprised of water (21.5 g), copolymerizable surfactant Hitenol BC-10 (1.3 g), styrene (50.2 g), methyl methacrylate (50.4 g), butyl acrylate (5.0 g) and methacrylic acid (0.5 g) was added over 90 minutes. Residual monomer was reduced by typical methodology using ascorbic acid and t-butyl hydroperoxide. After cooling to near ambient temperature, pH was adjusted to ~8 with dilute potassium hydroxide; inkjet suitable aqueous biocides were added. The two monomer compositions' homopolymer refractive indices were 1.45 and 1.54, resp. The resulting acrylic latex is 41% solids; particle size 0.23µ; viscosity<50 cps and had a core/shell structure.

Example 5

Inkjet Ink Preparation

An inkjet ink was formulated with the latex of Example 1, according to the compositional elements and amounts listed in Table 1.

TABLE 1

| Compositional Elements (on active basis) | Ink (wt %) |
|---|---|
| 2-Pyrrolidinone | 16 |
| 2-Methyl-1,3-propanediol | 9 |
| Crodafos ™ N3 Acid | 0.5 |
| Nonionic surfactant | 0.5 |
| Silicone surfactant | 1.0 |
| Latex from Example 1 | 7 |
| Pigment dispersion (black) | 1.5 |
| Michem ® Emulsion 48040M2 | 1 |
| Water | Balance |

Example 6

Comparative Inkjet Ink

A comparative ink was formulated with the latex of Example 2, according to the compositional elements and amounts listed in Table 2.

TABLE 2

| Compositional Elements (on active basis) | Ink (wt %) |
|---|---|
| 2-Pyrrolidinone | 16 |
| 2-Methyl-1,3-propanediol | 9 |
| Crodafos ™ N3 Acid | 0.5 |
| Nonionic surfactant | 0.5 |
| Silicone surfactant | 1.0 |
| Latex from Example 2 | 7 |
| Pigment dispersion (black) | 1.5 |
| Michem ® Emulsion 48040M2 | 1 |
| Water | Balance |

Example 7

Inkjet Ink

An inkjet ink was formulated with the latex of Example 3, according to the compositional elements and amounts listed in Table 3.

TABLE 3

| Compositional Elements (on active basis) | Ink (wt %) |
|---|---|
| 2-Pyrrolidinone | 16 |
| 2-Methyl-1,3-propanediol | 9 |
| Crodafos ™ N3 Acid | 0.5 |
| Nonionic surfactant | 0.5 |
| Silicone surfactant | 1.0 |
| Latex from Example 3 | 7 |

TABLE 3-continued

| Compositional Elements (on active basis) | Ink (wt %) |
|---|---|
| Pigment dispersion (black) | 1.5 |
| Michem ® Emulsion 48040M2 | 1 |
| Water | Balance |

Example 8

Data

The inks of Examples 5 and 6 were tested for L* and fingernail scratch testing for varying levels of wax emulsions as shown in Table 4. Additionally, the inks of Examples 5 and 7 were tested for L* and finger nail scratch testing as shown in Table 5.

TABLE 4

| | | Wax Emulsion Level (wt %) | | | | |
|---|---|---|---|---|---|---|
| | | 0.0 | 0.5 | 1.0 | 1.5 | 2.0 |
| Black L* | Example 5 | 7.7 | 8.0 | 9.3 | 7.9 | 9.0 |
| | Example 6 | 6.3 | 7.1 | 8.8 | 14.9 | 18.4 |
| Fingernail Scratch‡ | Example 5 | 2 | 0.5 | 0.5 | <0.5 | <0.5 |
| | Example 6 | 3 | 3 | 2 | 1.5 | 0.5 |

‡Scale: 5 = Poor; 0 = Excellent

TABLE 5

| | Wax Emulsion Level | 1.0 wt % |
|---|---|---|
| Black L* | Example 5 | 9.3 |
| | Example 7 | 9.5 |
| Fingernail Scratch‡ | Example 4 | 0.5 |
| | Example 6 | 0.5 |

‡Scale: 5 = Poor; 0 = Excellent

TABLE 6

| Measured Glass Transition (Tg) Temperature | |
|---|---|
| Example 1‡ | 106° C. |
| Example 2 | 106° C. |

‡No low Tg transition was seen

As shown in Table 4, the ink with the present latex provided better durability than the comparative ink having a traditional homopolymer structure as evidenced by the fingernail scratch testing. Additionally, the L* value was significantly improved at concentrations over 1% of wax emulsion. Notably, excellent results were achieved for the present ink at 1.0%, 1.5% and 2.0% levels.

As shown in Table 5, the properties of the present latexes are independent of the order of manufacture. Specifically, regardless of which polymer strands were first synthesized, the latexes provided for the same characteristics as both formed the same type of structure, i.e., intermingled polymer strands. Such results provide evidence that the present latexes are structurally different than core/shell structured latexes, as core/shell would provide significantly different properties depending on which latex was present as the shell.

As shown in Table 6, the glass transition temperature (Tg) was tested for the latex of the present invention as well as the comparative homogenous latex. Similar to the homogenous latex, the present latex had no low Tg. The lack of two distinct Tg's indicate that the present latex comprise intermingled discrete polymer strands rather than a core/shell structure which would be expected to have two differing Tg's.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A latex particulate, comprising multiple intermingled discrete polymer strands, including:
    a low Tg polymer strand having a Tg below 50° C., and
    a high Tg polymer strand having a Tg at 50° C. or above;
    wherein the Tg of the high Tg polymer strand is at least 50° C. greater than the Tg of the low Tg polymer strand, wherein the average refractive index of the monomers of the low Tg polymer strand is within 1% of the average refractive index of the monomers of the high Tg polymer strand, and wherein the latex comprises intermingled discrete polymer strands of the low Tg polymer and the high Tg polymer, not in a core/shell structure.

2. The latex of claim 1, wherein the low Tg polymer strand is prepared from multiple co-monomers and the high Tg polymer strand is prepared from the same co-monomers at a different ratio.

3. The latex of claim 2, wherein the multiple co-monomers are selected that have an average refractive index within 1% of one another.

4. The latex of claim 1, wherein the average refractive index of the monomers of the low Tg polymer strand are within 0.5% of the average refractive index of the high Tg polymer strand's monomers.

5. The latex of claim 1, wherein the Tg of the low Tg polymer strand is at or below 20° C. and the Tg of the high Tg polymer strand is at or above 90° C.

6. The latex of claim 1, wherein the Tg of the high Tg polymer strand is at least 100° C. above the Tg of the low Tg polymer strand.

7. The latex of claim 1, wherein the monomers of the low Tg polymer strand and the monomers of the high Tg polymer strand are selected from the group of acrylates, methacrylates, vinyls, styrenes, ethylene, vinyl chloride, vinylidene chloride, maleate esters, fumarate esters, itaconate esters combinations thereof, and mixtures thereof.

8. An inkjet ink, comprising:
    an ink vehicle; and
    a latex particulate, comprising multiple intermingled discrete polymer strands, including:
        a low Tg polymer strand having a Tg below 50° C., and
        a high Tg polymer strand having a Tg at 50° C. or above;
    wherein the Tg of the high Tg polymer strand is at least 50° C. greater than the Tg of the low Tg polymer strand, and wherein the average refractive index of the monomers of the low Tg polymer strand is within 1% of the average refractive index of the monomers of the high Tg polymer strand.

9. The inkjet ink of claim 8, further comprising a pigment.

10. The inkjet ink of claim 8, wherein the ink vehicle includes water and co-solvent having a boiling point from 160° C. to 250° C., the co-solvent present in an amount of 1 wt % to 40 wt %; and wherein the ink vehicle includes no more than 3 wt % non-volatile co-solvent and no more than 5 wt % volatile co-solvent.

11. The inkjet ink of claim 8, wherein the wherein the low Tg polymer strand is prepared from multiple co-monomers and the high Tg polymer strand is prepared from the same co-monomers at a different ratio.

* * * * *

UNITED STATES PATENT AND TRADEMARK OFFICE
CERTIFICATE OF CORRECTION

| | | |
|---|---|---|
| PATENT NO. | : 9,550,899 B2 | Page 1 of 1 |
| APPLICATION NO. | : 14/426652 | |
| DATED | : January 24, 2017 | |
| INVENTOR(S) | : David Michael Ingle et al. | |

It is certified that error appears in the above-identified patent and that said Letters Patent is hereby corrected as shown below:

On the Title Page

Item (12) should read --Ingle, et al.--

Item (75) "David Michael Ingle, Jr." should read --David Michael Ingle--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*